United States Patent [19]
Dimitri

[11] Patent Number: 5,304,527
[45] Date of Patent: Apr. 19, 1994

[54] PREPARATION FOR HIGH ACTIVITY, HIGH DENSITY CARBON

[75] Inventor: Mitchell S. Dimitri, Charleston, S.C.

[73] Assignee: Westvaco Corporation, New York, N.Y.

[21] Appl. No.: 977,010

[22] Filed: Nov. 16, 1992

[51] Int. Cl.⁵ .................. C01B 31/12; B01J 20/20; B01D 53/04
[52] U.S. Cl. .................. 502/425; 95/143; 95/146; 502/416; 502/424
[58] Field of Search .................. 502/423–427

[56] References Cited

U.S. PATENT DOCUMENTS

| | | | |
|---|---|---|---|
| 2,083,303 | 6/1937 | Krczil | 502/425 |
| 2,508,474 | 5/1950 | Slyh et al. | 502/424 |
| 2,580,647 | 1/1952 | Bielawski | 502/420 |
| 3,676,365 | 7/1972 | Shirai et al. | 502/423 |
| 4,155,878 | 5/1979 | Tolles et al. | 502/425 |
| 4,869,739 | 9/1989 | Kanome et al. | 55/387 |
| 5,039,651 | 8/1991 | Kosaka et al. | 502/424 |
| 5,162,286 | 11/1992 | Mac Dowell et al. | 502/424 |

*Primary Examiner*—Paul E. Konopka
*Attorney, Agent, or Firm*—Terry B. McDaniel; Daniel B. Reece, IV; Richard L. Schmalz

[57] ABSTRACT

Lignocellulosic carbonaceous material is activated to produce a high activity, high density gas-phase activated carbon under conditions which effectively alter the particle pore volume size distribution to optimize the carbon's mesoporosity. A novel process is disclosed for producing the carbon.

3 Claims, 2 Drawing Sheets

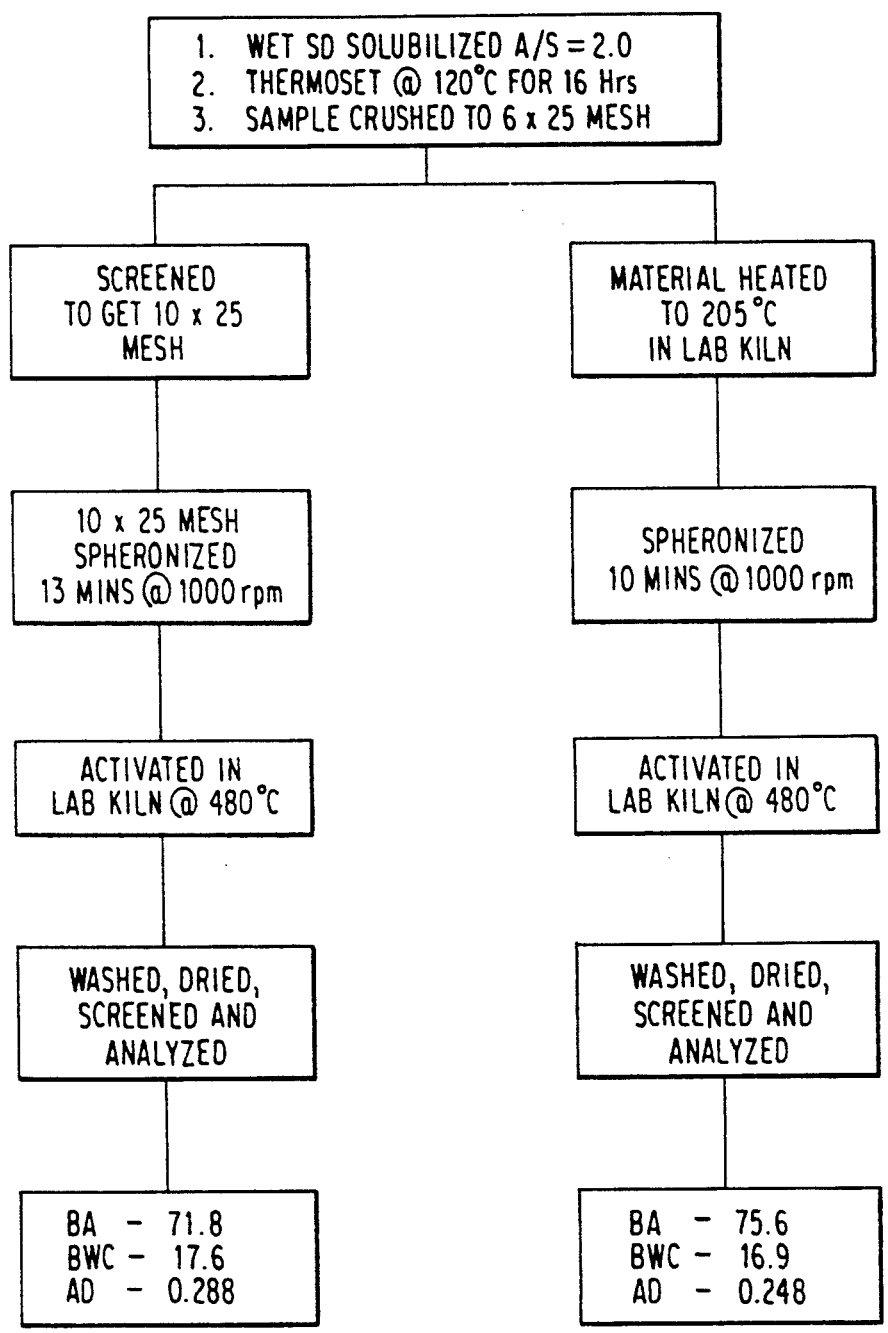

PREPARATION FOR HIGH ACTIVITY, HIGH DENSITY CARBON

BACKGROUND OF THE INVENTION

1. Field of the Invention

The present invention relates to activated carbon and methods for preparing same. Particularly, this invention relates to new carbons useful in vapor adsorption and methods for their production. More particularly, this invention relates to activated carbon derived from lignocellulosic material prepared by chemical activation and shaping to produce carbon of high density and high activity.

2. Description of the Prior Art

Activated carbon is a microcrystalline, nongraphitic form of carbon which has been processed to increase internal porosity. Activated carbons are characterized by a large specific surface area typically in the range of 500–2500 $m^2/g$, which permits its industrial use in the purification of liquids and gases by the adsorption of gases and vapors from gases and of dissolved or dispersed substances from liquids. Commercial grades of activated carbon are designated as either gas-phase or liquid-phase adsorbents. Liquid-phase carbons generally may be powdered, granular, or shaped; gas-phase, vapor-adsorbent carbons are hard granules or hard, relatively dust-free shaped pellets.

Generally, the larger the surface area of the activated carbon, the greater its adsorption capacity. The available surface area of activated carbon is dependent on its pore volume. Since the surface area per unit volume decreases as individual pore size increases, large surface area is maximized by maximizing the number of pores of very small dimensions and/or minimizing the number of pores of very large dimensions. Pore sizes are defined as micropores (pore width > 1.8 nm), mesopores (pore width = 1.8–50 nm), and macropores (pore width > 50 nm). Micropores and mesopores contribute to the adsorptive capacity of the activated carbon; whereas, the macropores reduce the density and can be detrimental to the adsorbant effectiveness of the activated carbon, on a carbon volume basis. The adsorption capacity and rate of adsorption depend to a large extent upon the internal surface area and pore size distribution. Conventional chemically activated lignocellulose-based carbons generally exhibit macroporosity (macropore volume) of greater than 20% of the carbon particle total volume. Gas-phase activated carbon macroporosity of less than 20% of the carbon particle volume would be desirable. Likewise, a high percentage of mesoporosity (i.e., above 50% of total particle volume) is desirable.

Commercial activated carbon has been made from material of plant origin, such as hardwood and softwood, corncobs, kelp, coffee beans, rice hulls, fruit pits, nutshells, and wastes such as bagasse and lignin. Activated carbon also has been made from peat, lignite, soft and hard coals, tars and pitches, asphalt, petroleum residues, and carbon black.

Activation of the raw material is accomplished by one of two distinct processes: (1) chemical activation, or (2) thermal activation. The effective porosity of activated carbon produced by thermal activation is the result of gasification of the carbon at relatively high temperatures (after an initial carbonization of the raw material), but the porosity of chemically activated products generally is created by chemical dehydration/condensation reactions occurring at significantly lower temperatures.

Chemical activation typically is carried out commercially in a single kiln. The carbonaceous material precursor is impregnated with a chemical activation agent, and the blend is heated to a temperature of 450°–700° C. Chemical activation agents reduce the formation of tar and other byproducts, thereby increasing yield.

A "hard active carbon of high adsorptive power in the shaped or moulded state" is taught in U.S. Pat. No. 2,083,303 to be prepared by impregnating pulverized organic raw material, such as "sawdust, peat lignite or the like" with "known activating agents, such as zinc chloride or phosphoric acid" and heated to 100°–200° C. for one to one and a half hours producing a partially carbonized state wherein the material is somewhat plastic. Without reducing the temperature, the material is molded under pressure to a desired shape. The shaped material then is activated in a rotary activating retort and brought to a temperature of 450°–600° C. for about four hours.

Similarly, U.S. Pat. No. 2,508,474 teaches a gas mask activated carbon to be prepared by impregnating low density cellulosic material, such as finely divided wood in the form of wood shavings or sawdust, with concentrated zinc chloride, and heating to 120°–145° C. while agitating for not less than fifty minutes. The reacted mass then is compacted into "forms of appreciable size;" said forms are dried at 160°–300° C.; the dried forms are crushed into granular particles; the granules are calcined at 675°–725° C.; and, after leaching out of the particles a greater portion of residual zinc chloride, recalcining the activated carbon product at 1000°–1100° C. for at least thirty minutes.

These representative techniques have produced activated carbon of adequate activity and density for many gas-phase applications, especially for purification and separation of gases as in industrial gas streams, in odor removal in air conditioning systems, and in gas masks. However, older technology gas-phase activated carbons have not proven entirely satisfactory in some applications for recovery (not just removal) of organic vapors which involves adsorption onto the carbon surface followed by desorption from the carbon for recapture. In fact, due to environmental concerns and regulatory mandates, one of the largest single applications for gas-phase carbon is in gasoline vapor emission control canisters on automobiles. Evaporative emissions vented from both fuel tank and carburetor are captured by activated carbon.

Fuel vapors, vented when the fuel tank or carburetor is heated, are captured in canisters generally containing from 0.5 to 2 liters of activated carbon. Regeneration of the carbon is accomplished by using intake manifold vacuum to draw air through the canister. The air carries desorbed vapor into the engine where it is burned during normal operation. An evaporative emission control carbon should have suitable hardness, a high vapor working capacity, and a high saturation capacity. The working capacity of a carbon for gasoline vapor is determined by the adsorption-desorption temperature differential, by the volume of purge air which flows through the carbon canister, and by the extent to which irreversibly adsorbed, high molecular weight gasoline components accumulate on the carbon.

Because of various economic considerations and space limitations in placing the carbon canister on-board a vehicle, this particular application of granular or shaped activated carbon requires higher activity and higher density properties than typically produced by the older technology noted. One method to control product density is taught by published European Patent Application 0 423 967 A2. The applicants note "a number of problems inherent in the use of wood as a raw material to produce directly a chemically activated pelletised form," claiming it to be "impossible to produce a high density activated carbon from a wood flour material" for lack of sufficient natural binding agent. An improved product (of substantially increased density) is claimed by use of, as a starting material, a "young carbonaceous vegetable product" having a "high concentration of natural binding agent." Such materials include nut shell, fruit stone and kernel, and in particular olive stone, almond shell, and coconut shell.

Also, U.S. Pat. Nos. 5,039,651 and 5,118,329 teach densification of activated carbon product from cellulose materials including coconut shells, wood chips, and sawdust by pressing after initially heating to a relatively low temperature, followed by extrusion and calcination. Yet, with this improved processing the patentees could produce only carbons that were measured to have a volumetric working capacity (in terms of butane Working capacity, or BWC) of up to 12.3 g/100 cm$^3$, although BWC values up to 15 g/100 cm$^3$ are claimed.

These prior art gas-phase carbons may have been satisfactory for limited volumes of vapors emitted from the carburetor and fuel tank. Because of impending environmental regulations requiring capture of greater amounts of fuel vapor emissions, it is anticipated that the volume of these additional vapors, combined with the space limitations and economic considerations which limit expansion of the size of canister systems, will require activated carbons with higher densities, higher activities, and higher volumetric working capacities than disclosed by the prior art (e.g., BWC>15 g/100 cm$^3$).

Recently, co-pending and commonly assigned U.S. patent application Ser. No. 853,133 claimed a method for making a high activity, high density activated carbon suitable for gasoline vapor adsorption applications which involved chemically activating lignocellulose fragments with phosphoric acid at and acid:sawdust ratio of 3:1 to 1:3, preferably 1.6, and heating for a time such that the discrete particle nature of the fragment was preserved before spheronizing the individual particles, heating again to thermoset, and subjecting to activation temperatures. While this method reported the production of seven runs which produced BWC values from 16.1 to 18.2 g/100 cm$^3$ and averaged a BWC of 17.1 g/100 cm$^3$, it is but one method of producing such activated carbon material.

Therefore, it is an object of this invention to provide a novel chemical activation process for producing activated carbons of high activity and relatively high density suitable for solvent and vapor capture and recovery, without sacrificing carbon density. It is a further object of this invention to produce the carbon without preserving the discrete particle nature of the lignocellulose fragment starting material.

SUMMARY OF THE INVENTION

The above objects of the invention are achieved by the chemical activation of a carbonaceous material, preferably lignocellulosic material, with a chemical activation agent in a manner to produce a viscous fluid product which is dried and heated to initial transition from plastic to thermoset intermediate product, granulated, and the granules are densified in a spheronizer to effectively minimize the macropore structure of the activated carbonaceous material. Densification is followed by increasing the temperature of the shaped product at a controlled rate to from 425° C. to 650° C., preferably from 450° to 590° C., and most preferably from 480° to 510° C.

The novel high activity, high density gas-phase activated carbons produced are characterized by butane working capacities from above 15 to about 25 g/100 cm$^3$, preferably from about 17 to about 25 g/100 cm$^3$, and more preferably from about 19 to about 25 g/100 cm$^3$, a butane activity of from about 50 to about 80 g/100 g, preferably from about 60 to about 80 g/100 g, and more preferably from about 70 to about 80 g/100 g, and a density of from about 0.25 to about 0.40 g/cm$^3$, preferably from about 0.27 to about 0.40 g/cm$^3$, more preferably from about 0.30 to about 0.40 g/cm$^3$.

Preferably, such an activated carbon material also would exhibit a mesopore content of greater than about 50%, preferably greater than about 60%, and more preferably greater than about 70%, based on the total particle volume, and a macropore content of less than 20%, preferably less than 18%, and more preferably less than 15%, based on the total particle volume.

BRIEF DESCRIPTION OF THE DRAWINGS

FIG. 2 presents a diagram of the process steps of the invention, indicating the advantage of selecting a predetermined size of granules to subject to densification/shaping to optimize product properties.

DESCRIPTION OF THE PREFERRED EMBODIMENTS

Figure 1:
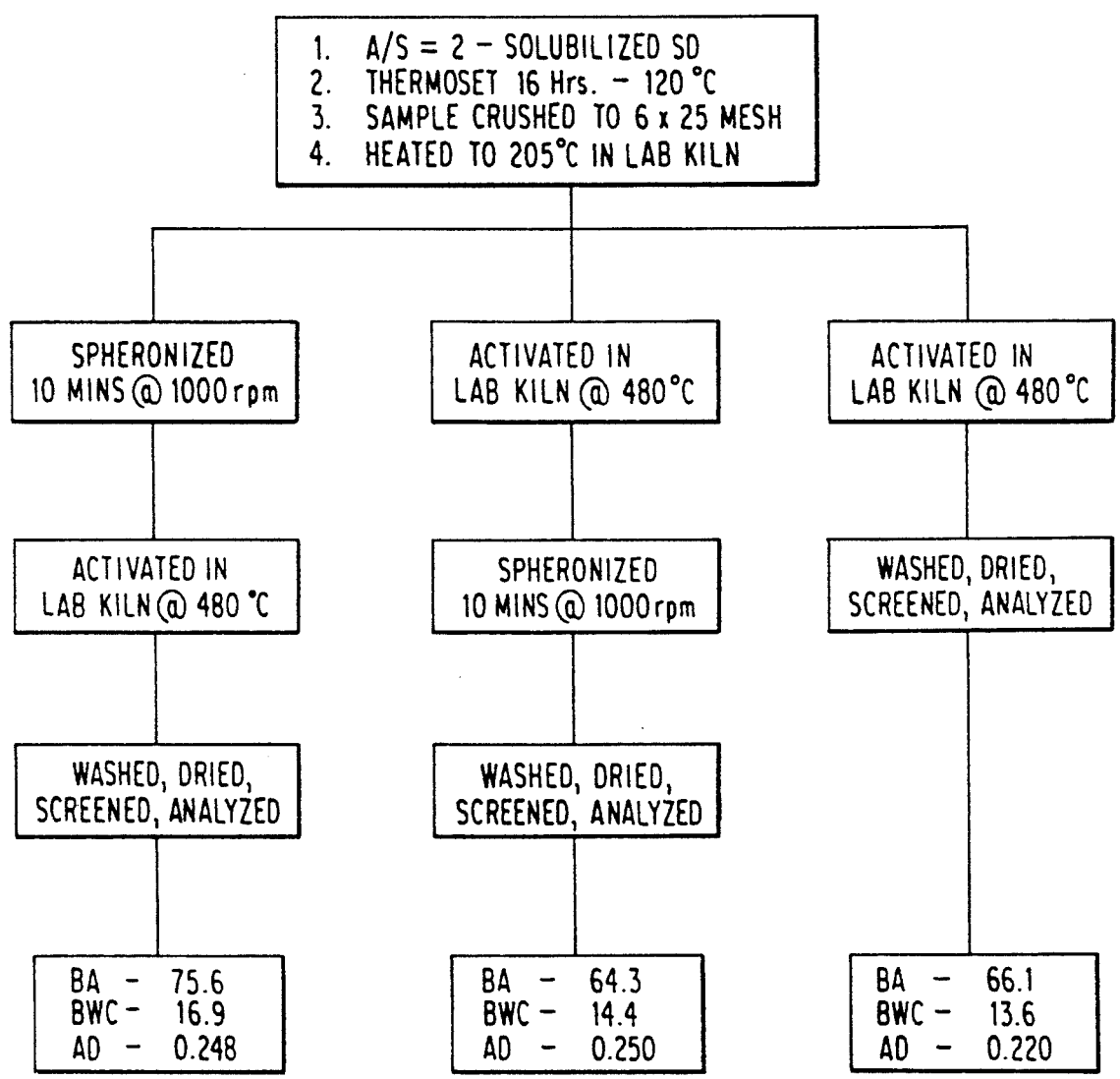
FIG. 1 presents a diagram of the process steps of the invention method versus an alternative order of processing steps, indicating advantages of the invention method.

The raw material precursor in the invention chemical activation may be any of the carbonaceous material of plant or mineral origin earlier recited. Preferred precursors primarily are lignocellulosic materials of plant origin and include wood-based materials such as wood chips, wood flour, and sawdust, as well as nut pits and nut shells such as coconut shell. Chemical activation agents which may be equally effective include: alkali metal hydroxides, carbonates, sulfides, and sulfates; alkaline earth carbonates, chlorides, sulfates, and phosphates; phosphoric acid; polyphosphoric acid; pyrophosphoric acid; zinc chloride; sulfuric acid; and oleum. Most preferred is phosphoric acid.

The invention methods for producing the novel carbon can be described generally by the following sequence of steps:

1. Activating agent/lignocellulose material blending
2. Stage 1 heat treatment (lignocellulose degradation)
3. Stage 2 heat treatment (drying and plasticization to thermoset)
4. Shaping and densifying
5. Activation The activation typically occurs in a rotary kiln in which the temperature of the thermoset shaped mixture is raised, preferably, to from about 425° to about 650° C. This basic process normally is followed with washing (to remove residual phosphoric acid activating agent) and drying steps.

The method discovered for producing the invention activated carbon product involves blending a chemical activating agent, preferably phosphoric acid or zinc chloride (which, optionally, may be pre-heated at a temperature of 80°–120° C.), with a lignocellulose material, preferably wood chips, sawdust (or, wood dust), or wood flour, at a ratio of $\geq 1.6:1$, respectively, preferably $\geq 2:1$, with agitation for up to one hour at a temperature of from about 35° C. to about 95° C., after which the mixture material is converted to a viscous fluid product which is spread on glass trays and heat treated at from about 70° to about 130° C., first to dry the material and, subsequent to drying, to heat the dried material to the point of transition from plastic in nature to thermoset (up to about 20 hours). The resultant solidified material is granulated and the granules are subjected to a densification step which involves processing through a compressive shaping device such as a spheronizer. A commonly used spheronizer is a Marumerizer ®. (Optionally, after granulation and before densification, the granulated material may be thermoset at a kiln temperature of from 200° to 220° C., but no particular benefit appears to be derived therefrom.) After shaping/densification, the material is activated by gradually increasing the temperature to a final temperature of from 425° to 650° C.

The degradation, or (at least partial) solubilization, of wood with phosphoric acid produces a viscous fluid in which the discrete particles of the original lignocellulose may or may not be identified. In the solubilization process, the initial viscosity of the slurry mixture is very close to that of the phosphoric acid alone. As the temperature rises, the viscosity of the mass increases as the wood elements thereof degrade. If the viscosity increases too fast during this stage 1 heat treatment, water can be added to maintain sufficient fluidity for continued mixing under heat at, preferably, from about 80° C. to about 120° C.

The surprising improvement in butane working capacity of the new carbon product reflects a major increase in mesoporosity of the individual carbon particles, at the expense of macroporosity.

A standard determination of surface area of activated carbon usually is by the Brunauer-Emmett-Teller (BET) model of physical adsorption using nitrogen as the adsorptive. This was the method employed in calculating the invention carbon surface areas, based on nitrogen adsorption isotherm data in the range of 0.05 to 0.20 relative pressure.

In the case of granular activated carbon, the density is an important feature of the effectiveness of the adsorbent, as many applications of granular or shaped activated carbon involve a static active carbon bed of fixed volumetric size. The apparent density of the invention activated carbon is measured according to the method ASTM D 2854. Measurements of apparent density of carbon in a packed bed of particles reported herein were based on 10×25 mesh carbon materials, unless otherwise noted.

The density of the individual carbon particles was determined by displacement of mercury using a Micromeritics Pore Sizer 9300 instrument. The density is based on the mass of a particle and its volume including pores smaller than 35 micrometers.

Butane activity of the invention carbons was calculated by placing a weighed sample of the dry activated carbon, approximately 15 ml in volume, in a 1.45 cm diameter tube and admitting butane gas therein. The amount adsorbed at saturation at 25° C. is weighed and reported as butane activity in grams of butane per 100 grams carbon (g/100 g). The tube then is purged with air at 25° C. at 250 ml/min. for 40 minutes, and the amount of butane removed is reported as butane working capacity (BWC) in grams of butane per 100 ml of carbon (g/100 cm$^3$). The carbon mass to volume conversion is made on the basis of the measured value of the carbon apparent density. In view of the interrelationship of butane activity, BWC, and density, for carbons of a density from about 0.25 to about 0.40 g/cm$^3$, a BWC >15 g/100 cm$^3$ can be achieved with butane activity values of at least 50 g/100 g.

Porosity in pores larger than 50 nm (macroporosity) was determined using a Micromeritics Pore Sizer 9310 which measures the volume of mercury forced into pore under the influence of pressure. The distribution of pore volume with pore size is calculated using the Washburn equation, a standard model.

Porosity in pores smaller than 50 nm was determined using a Micromeritics DigiSorb 2600. Adsorption isotherm data for nitrogen, measured at a temperature of about 77° K., are used with the Kelvin and Halsey equations to determine the distribution of pore volume with pore size of cylindrical pores according to the standard model of Barrett, Joyner, and Halenda. For the purposes of the examples and the invention claimed herein, macroporosity consists of pore diameters greater than 50 nm, mesoporosity consists of pore diameters of from 1.8 to 50 nm and microporosity consists of pore diameters of less than 1.8 nm.

The invention method for producing the activated carbon product are disclosed in the following examples.

EXAMPLE 1

An activated carbon product was prepared by heating 698 g of 85% phosphoric acid to 105° C. Sawdust in a total amount of 300 g (dry basis) was added (causing the acid temperature to drop) and mixed as the temperature of the mixture was raised to 75° C. Mixing continued for 57 minutes with periodic addition of sufficient water to maintain fluidity. The viscous fluid product then was transferred to glass trays and heat treated to transition from plastic to initial thermoset (at a temperature of 120° C. for 16 hours). The resultant solidified product was granulated (in an Osterizer ®) and the granules were processed in a Marumerizer for 13 minutes converting them to smooth, spherical particles. Finally, this product was activated in a direct fired, rotary kiln by heating to 480° C. The resultant activated carbon had the following product properties:

| | |
|---|---|
| Butane Working Capacity | 17.6 g/100 cm$^3$ |
| Butane Activity | 71.8 g/100 g |
| Apparent Density | 0.29 g/cm$^3$ |
| Particle Density | 0.46 g/cm$^3$ |
| Macropore Content | 13% |
| Mesopore Content | 55% |

EXAMPLE 2

For a comparison of the effects of the spheronization step and of the order of the steps of spheronization and activation, the samples described in FIG. 1 were prepared as follows:

(1) Sawdust (moisture=44.2%) in the amount of 538 grams was blended (in four charges over two minute period) with 697.7 grams of phosphoric acid (concentration = 86%, and pre-heated to 105° C.) in a mixing bowl and stirred (Kitchenaid ® Proline blender with SS flat blade) under heat (~75° C.) for ~40 minutes, after which 650 cc of hot tap water (~95° C.) was added over two minute period and stirring was continued for a total mix time of ~1.0 hour;

(2) The viscous, tarry mass of material (with some unsolubilized sawdust visible) was transferred to glass drying trays, smoothed to form layers of a thickness of ~1.0 inch, and dried in an oven at ~120° C. for 16–18 hours to thermoset; and (3) The thermoset material was granulated in an Osterizer ® to 6×25 mesh, heated further in a lab kiln to 205° C., and divided into three samples, each of which was further processed according to FIG. 1.

FIG. 1 disclosed that the sample subsequently activated, washed, dried, and screened (for 10×25 mesh) exhibited marginally acceptable (<70 g/100 g) butane activity, conventional BWC (<15 g/100 cm$^3$), and low apparent density. The sample which was activated prior to spheronizing showed the benefits of significantly enhanced density and an improved (though still conventional) BWC value, but suffered an even lower butane activity value. Finally, the invention process benefits are disclosed in the sample which is spheronized prior to activation. Analysis of this sample discloses attainment of a non-conventionally high BWC value, i.e., >15 g/100 cm$^3$, a significantly improved and a preferred butane activity value, i.e., >70 g/100 g, both of which are achieved with a significant improvement in density (versus no spheronization).

EXAMPLE 3

For a comparison of the effects of optional subsequent kiln thermosetting at temperatures up to 220° C. and of the effects of granular size on product properties, the samples described in FIG. 2 were prepared as in Example 3, with the exception that the granulated material was divided into two samples prior to the further lab kiln thermosetting step. These two samples were treated further as disclosed in FIG. 2.

One sample is the same as the invention sample from Example 2/FIG. 1. The remaining sample, which was not heated to a higher temperature in the lab kiln, was screened to the desired 10×25 mesh size prior to spheronization and activation. As a result, the BWC and apparent density values were enhanced to preferred ranges while maintaining butane activity also in the preferred range for use in gasoline vapor adsorption.

In the above examples, activated carbon of surprisingly high butane working capacity is produced by increasing surface area without sacrificing material density. This has been achieved by increasing carbon particle mesoporosity. In most instances the increase in mesoporosity has been created, unexpectedly, at the expense of the carbon particle's macroporosity.

While the invention high activity, high density carbon has been described and illustrated herein by references to various specific materials and procedure, it is understood that the invention is not restricted to the particular materials, combinations of materials, and procedure selected for that purpose. With the disclosure herein of the concepts employed to produce the novel carbon, numerous variations of such details can be employed, as will be appreciated by those skilled in the art.

What is claimed is:

1. An improved process for preparing an activated carbon comprising pre-heating a phosphoric acid activating agent to from about 70° to about 130° C., blending lignocellulosic material fragments with said agent, heating the blended material at a temperature of from about 35° to about 95° C. for one hour to result in a plasticized product, shaping the product, and subjecting the shaped material to activation temperatures of from about 450° to about 590° C. wherein the improvement comprises producing an activated carbon characterized by a butane working capacity of from greater than about 15 to about 25 g/100 cm$^3$, a mesopore volume of greater than 50% and a macropore volume of less than 20%, based on total pore volume, and a density of from about 0.25 to about 0.40 g/cm$^3$ by blending the agent and lignocellulose fragments in a ratio of $\geq 1.6:1$, respectively, conducting the plasticization step with addition of sufficient moisture to maintain fluidity of the blended material and to the point at which the individual fragments are degraded and the blend is converted to a viscous fluid which is dried and heated to its transition point from plastic to thermoset, granulating the dried product in a blender to 6×25 mesh size prior to shaping, and shaping the granulated product in a spheronizer.

2. The improved process of claim 1 wherein the lignocellulosic material is selected from the group consisting of wood chips, sawdust, and wood flour.

3. The improved process of claim 1 wherein the agent to fragment ratio is $\geq 2:1$.

* * * * *

UNITED STATES PATENT AND TRADEMARK OFFICE
CERTIFICATE OF CORRECTION

PATENT NO.  : 5,304,527
DATED       : April 19, 1994
INVENTOR(S) : Mitchell S. Dimitri It is certified that errors appear in the above-identified patent and that said Letters Patent is hereby corrected as shown below:

In Column 1, Line 38, delete "(pore width > 1.8 nm)" and substitute therefor -- (pore width < 1.8 nm) --.

In Column 3, Line 46, "fragment" should read --fragments--.

In Column 6, Line 17, "pore" should read --pores--.

Signed and Sealed this

Ninth Day of August, 1994

Attest:

BRUCE LEHMAN

Attesting Officer

Commissioner of Patents and Trademarks